(12) United States Patent
Aoyagi et al.

(10) Patent No.: US 6,894,855 B2
(45) Date of Patent: May 17, 2005

(54) MAGNETIC DISK DRIVE INCLUDING READ CHANNEL FOR PROCESSING DIFFERENTIATED READ SIGNAL

(75) Inventors: Yuka Aoyagi, Tachikawa (JP); Akihiko Takeo, Kunitachi (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 102 days.

(21) Appl. No.: 10/228,323

(22) Filed: Aug. 27, 2002

(65) Prior Publication Data
US 2003/0058561 A1 Mar. 27, 2003

(30) Foreign Application Priority Data
Sep. 27, 2001 (JP) .......................... 2001-298300

(51) Int. Cl.⁷ .............................................. G11B 5/09
(52) U.S. Cl. ........................ 360/39; 360/31; 360/53; 360/66; 360/40; 360/43; 360/45; 360/55
(58) Field of Search ................. 360/45, 43, 40, 360/55, 46, 66, 53, 31, 39

(56) References Cited

U.S. PATENT DOCUMENTS

| | | | |
|---|---|---|---|
| 5,130,866 A | * 7/1992 | Klaassen et al. | ............... 360/75 |
| 5,367,411 A | 11/1994 | Nishiyama et al. | |
| 5,384,671 A | * 1/1995 | Fisher | .......................... 360/51 |
| 6,157,507 A | 12/2000 | Korenari et al. | |
| 6,735,027 B2 | * 5/2004 | Helsel et al. | .................. 360/31 |

FOREIGN PATENT DOCUMENTS

| | | |
|---|---|---|
| DE | 197 22 823 A1 | 2/1998 |
| EP | 0 962 932 A2 | 12/1999 |
| JP | 60-22704 | 2/1985 |
| JP | 62-62407 | 3/1987 |
| JP | 4-286702 | 10/1992 |
| JP | 2000-340858 | 12/2000 |
| JP | 2001-56908 | 2/2001 |
| JP | 2001-110016 | 4/2001 |
| JP | 2002-298036 | 10/2002 |

OTHER PUBLICATIONS

Chinese Office Action, dated August 20, 2004 for Patent Application No. 02131837.9.

* cited by examiner

Primary Examiner—Sinh Tran
Assistant Examiner—Natalia Figueroa
(74) Attorney, Agent, or Firm—Pillsbury Winthrop LLP

(57) ABSTRACT

A disk drive of perpendicular magnetic recording method including a read head comprising a GMR element and a drive using a double-layered disk medium, is disclosed. In the magnetic field response characteristic of the GMR element, the relationship between the degree of nonlinearity and a pulse width at 50% threshold (PW50) of a differentiated read signal is used. The degree of nonlinearity of the GMR element is adjusted such that the PW50 is smaller than the maximum value. The read channel comprises a differentiation circuit for converting the read signal output from the GMR element into the differentiated read signal.

21 Claims, 4 Drawing Sheets

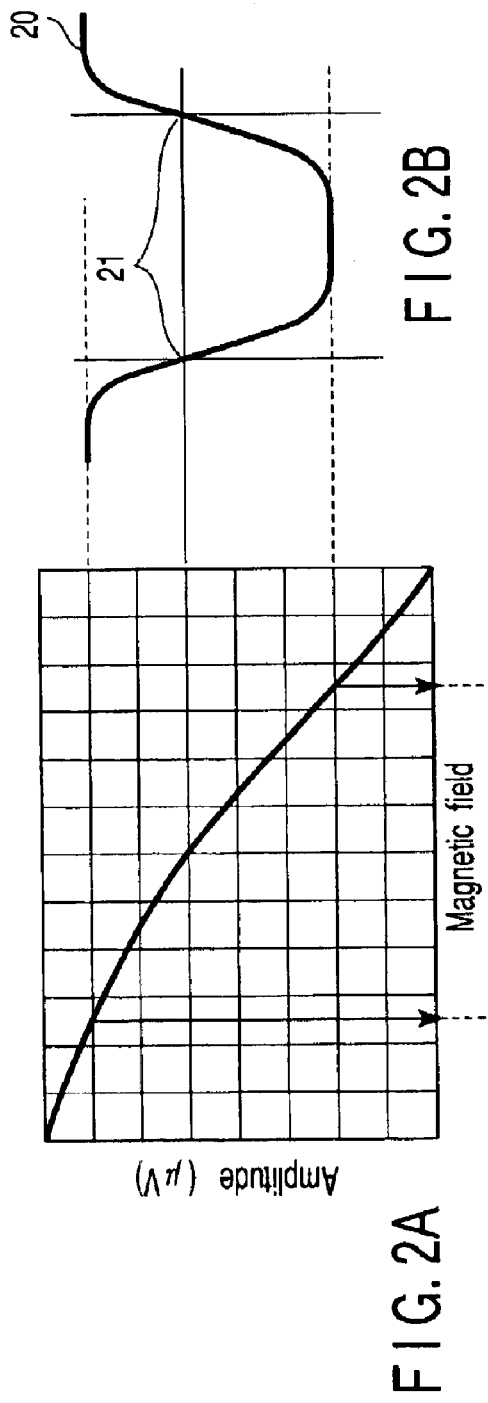
FIG. 2A
FIG. 2B
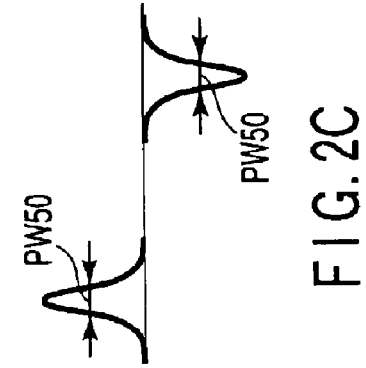
FIG. 2C
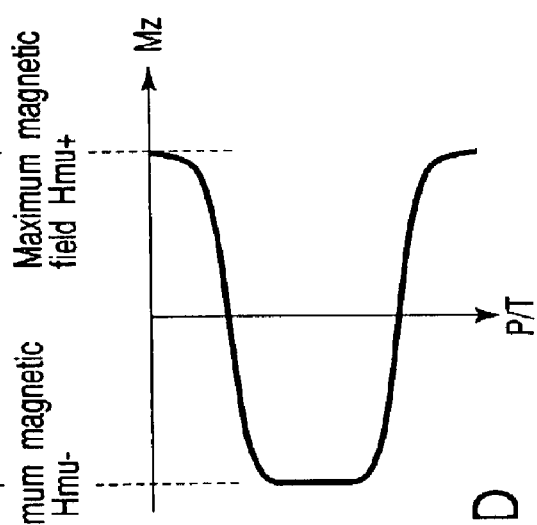
FIG. 2D

MAGNETIC DISK DRIVE INCLUDING READ CHANNEL FOR PROCESSING DIFFERENTIATED READ SIGNAL

CROSS-REFERENCE TO RELATED APPLICATIONS

This application is based upon and claims the benefit of priority from the prior Japanese Patent Application No. 2001-298300, filed Sep. 27, 2001, the entire contents of which are incorporated herein by reference.

BACKGROUND OF THE INVENTION

1. Field of the Invention

The present invention relates generally to the field of magnetic disk drives, and more particularly to a magnetic disk drive to which a perpendicular magnetic recording method is applied.

2. Description of the Related Art

In recent years, in the filed of magnetic disk drives as typified by hard disk drives, attention has focused on the perpendicular magnetic recording method as a technique for exceeding the recoding density limits imposed in the longitudinal magnetic recording method.

In the perpendicular magnetic recording method, if digital data (0/1) is recorded on a disk medium, a magnetized area corresponding to the data is formed in a perpendicular direction (depth direction) of the disk medium. Further, in the perpendicular magnetic recording method, the amplitude of a read signal read out from the disk by a read head transfers at a magnetization transfer position. The waveform of the read signal is a rectangular wave whose amplitude corresponds to the magnetization direction.

Therefore, if a read channel for the longitudinal magnetic recording method is diverted in a disk drive of the perpendicular magnetic recording method, a differentiation circuit for converting a read signal waveform into a differentiated signal waveform is needed.

In the latest disk drives, a magnetic head having a structure wherein a read head and a write head are separately mounted on a slider is adopted. In general, the write head is a single pole type (SPT) head suitable for the perpendicular magnetic recording method. The read head is a magnetoresistive (MR) head in both the methods, especially, a giant magnetoresistive (GMR) head using a GMR element.

In order to obtain a disk drive achieving a high recording density, improvements in characteristics of the GMR element (including a spin valve type MR element), which is a read head, have been promoted. More specifically, a method for ordering the magnetization directions of a free layer and a pinned layer of the GMR element to cross each other has been adopted. Prior art using the above method to achieve an excellent magnetic domain control of the free layer, thereby reducing Barkhausen noise, etc., has been proposed (refer, for example, to Jpn. Pat. Appln. KOKAI Publication No. 2001-110016).

A method has also been adopted for making the magnetic easy axis directions of the free layer and the pinned layer of the GMR element substantially parallel. Prior art using the above method to significantly vary the magnetization direction of the free layer, with respect even to small amounts of recording magnetic field information, thereby improving the sensitivity to magnetic fields has been proposed (refer, for example, to Jpn. Pat. Appln. KOKAI Publication No. 2001-56908).

Further, prior art has been proposed for providing a structure wherein a soft magnetic layer having a spin valve type MR film comprises a laminated element of two or more layers. Thereby, the detection sensitivity of a magnetic recording signal and the linearity of a read signal are improved, and the output characteristics of a read head are improved (refer, for example, to Jpn. Pat. Appln. KOKAI Publication No. 2000-340858).

In a disk drive of the perpendicular magnetic recording method, in general, a double-layered disk medium (DL disk medium) comprising a perpendicular recording layer and a soft magnetic layer is used. In such a DL disk medium, magnetic recording is carried out, as a data recording operation, by the magnetic coupling between the write head and the soft magnetic layer. Thus, the read head can detect a high recording magnetic field, when recorded data is read out from the disk medium.

On the other hand, in a disk drive of the perpendicular magnetic recording method, output saturation of a GMR element or waveform distortion of a read signal easily occurs, compared with that of the longitudinal magnetic recording method. In order to eliminate these problems, there is provided a method for improving the linearity in the magnetic response characteristic of the GMR element. Specifically, it is a method of increasing the linear response dynamic range to exceed the mean value of the recording magnetic field from the disk medium. Thereby, output saturation of a GMR element or occurrence of waveform distortion of a read signal can be prevented or suppressed.

As described above, in a disk drive of the perpendicular magnetic recording method, the waveform of the read signal output from the read head is a rectangular wave. Thus, the read channel includes a differentiation circuit for converting a read signal waveform into a differentiated signal waveform. The read channel reproduces data recorded on a disk medium from a read differentiated signal output from the differentiation circuit.

The reproduction resolution of the read channel is influenced by the magnitude of the pulse width at 50% threshold (sometimes expressed as PW50) of a read differentiated signal. The PW50 is associated with the degree of nonlinearity in the magnetic response characteristic of the GMR element. It has been recognized that the higher the degree of nonlinearity (i.e., linearity is reduced), the smaller (narrower) the PW50.

In general, in a magnetic recording system, the PW 50 is just as important a parameter as the S/N ratio, regarding the error rate. If the value of the PW50 increases, this results in reduction in reproduction error, especially in a high recoding density. It is desirable that the PW50 value be smaller.

BRIEF SUMMARY OF THE INVENTION

It is an object of the present invention to realize, in a magnetic disk drive for reproducing data from a read differentiated signal, minimization of the PW50 of the waveform of the read differentiated signal, thereby improving a data reproduction resolution.

In accordance with one aspect of the present invention, there is provided a magnetic disk drive including a read head with magnetic field response characteristics for decreasing the PW50 value of differentiated read signals.

The magnetic disk drive comprises:

a magnetic disk medium for magnetically recording data;

a signal processing circuit including a differentiation circuit for differentiating a read signal read out from the magnetic disk medium, and reproducing the data recorded on the magnetic disk medium from a read differentiated signal output from the differentiation circuit; and a read head for reading out the data magnetically recorded on the magnetic disk medium to output the read signal, and having a magnetic field response characteristic such that a pulse width at 50% threshold of a waveform of a read differentiated signal output from the differentiation circuit is set within a predetermined range.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIGS. 2A to 2D are diagrams for explaining a magnetic field response characteristic of a GMR element according to the embodiment of the present invention;

DETAILED DESCRIPTION OF THE INVENTION

An embodiment of the present invention will be described below with reference to the drawings.
(Structure of a Disk Drive)

Figure 1:
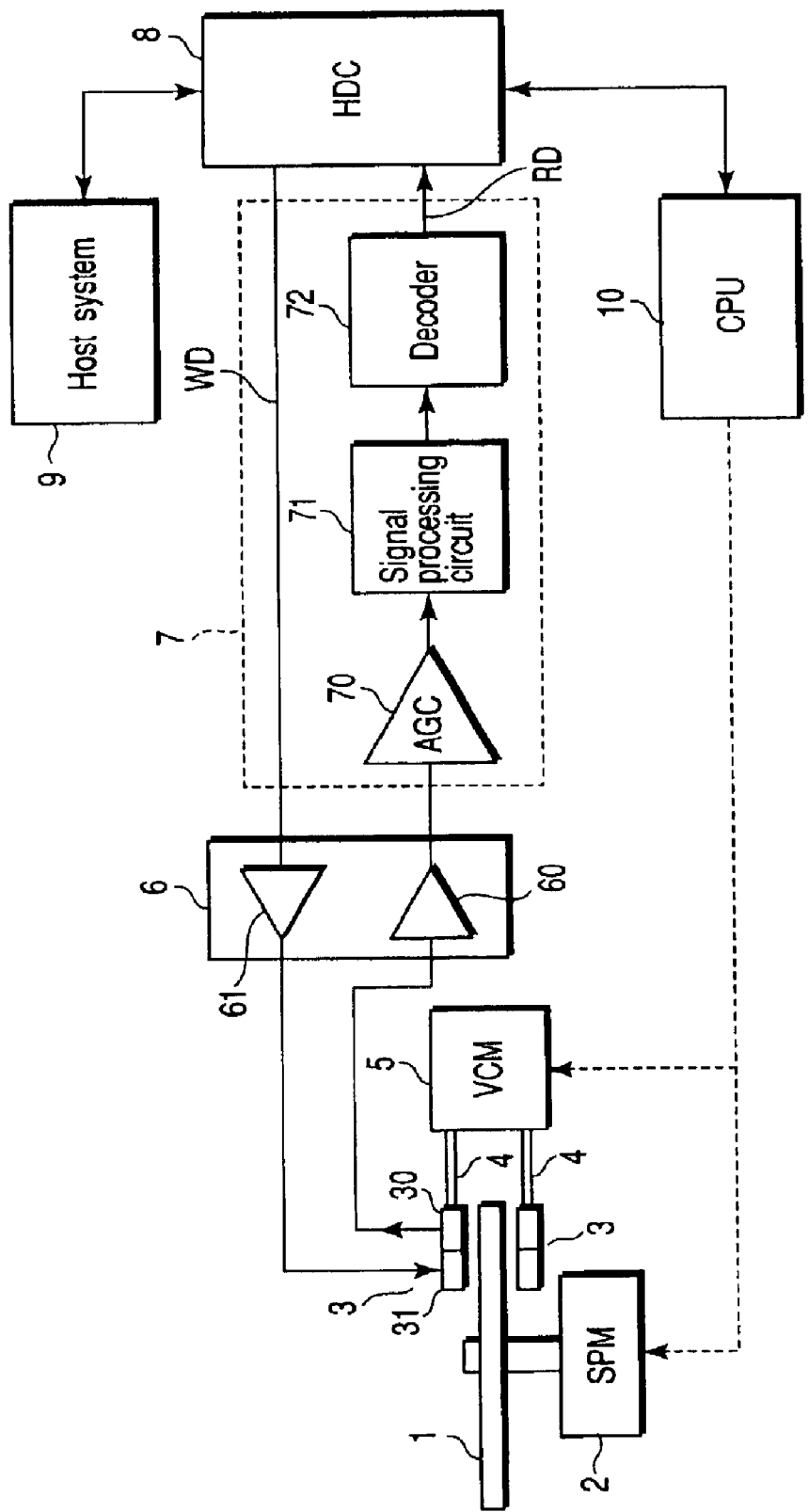
FIG. 1 is a block diagram showing a main part of a disk drive of a perpendicular magnetic recording method according to an embodiment of the present invention.

FIG. 1 is a block diagram showing a main part of a disk drive of a perpendicular magnetic recording method according to an embodiment of the present invention.

The disk drive of the present invention comprises a perpendicular disk medium 1, a spindle motor (SPM) 2, an actuator 4 on which a magnetic head 3 is mounted, as shown in FIG. 1.

At the time of a data recording/reproducing operation, the disk medium 1 is rotated at high speed by the SPM 2. The disk medium 1 is a double-layered perpendicular recording medium (DL medium) comprising a perpendicular recording magnetic layer and a soft magnetic layer.

Specifically, the disk medium 1 comprises a soft magnetic layer of a magnetic material such as CoZrNb or FeAlSi formed, by sputtering, on a glass base, for example. Further, a recording layer having perpendicular magnetic anisotropy is stacked on the soft magnetic layer. The disk medium 1 of the embodiment of the present invention may have a structure wherein a middle control layer is provided between the soft magnetic layer and the recording layer.

The magnetic head 3 comprises a read head 30 and a write head 31 separately mounted on the same slider. The actuator 4 has the magnetic head 3 mounted thereon, and moves the magnetic head 3 in a radial direction on the disk 1 using the driving power of a voice coil motor (VCM) 5.

The read head 30 is a read-only head for reading out data signals from the disk medium 1, and comprises a GMR element (or a spin valve type MR element). The write head 31 is, for example, a single pole type head (SPT head) suitable for the perpendicular magnetic recording method. The write head 31 generates a recording magnetic field corresponding to a write current supplied by a write amplifier 61, and performs perpendicular magnetic recording of data signals on the disk medium 1.

The disk drive further comprises a preamplifier circuit 6, a read/write channel (data channel) 7, a disk controller (HDC) 8, and a microprocessor (CPU) 10.

The preamplifier circuit 6 has a read amplifier 60 and a write amplifier 61. The read amplifier 60 amplifies the data signal (read signal) read from the read head 30 and sends the amplified signal to the read/write channel 7. The write amplifier 61 converts the data signal (write data WD) supplied by the read/write channel 7 into a write current and sends the write current to the write head 31.

The read/write channel 7 includes a read channel and a write channel, and is a PRML (partial response maximum likelihood) type signal processing circuit for processing read/write data signals.

The read channel basically comprises an AGC amplifier 70, a signal processing circuit 71, and a decoder 72. The AGC amplifier 72 has an AGC (automatic gain control) function, and maintains the level of the read signal to be constant. The signal processing circuit 71 is, for example, a digital type PRML signal processing circuit including a differentiation circuit, a low-pass filter, an A/D converter, an equalizer (waveform equalizing circuit), etc.

The differentiation circuit is a circuit for converting a read signal of a rectangular wave obtained in the perpendicular magnetic recording method, into a differentiated signal waveform (differentiated read signal). The decoder 72 decodes the data signal (digital signal) output from the signal processing circuit 71 to produce the original recorded data (read data RD).

The write channel performs processing such as encoding processing on the write data WD from the disk controller (HDC) 8, writing compensation processing, etc.

The HDC 8 forms an interface between the disk drive and a host system 9, and has a function of receiving write data WD from the host system 9 and transferring read data signals (RD) to the host system 9. The CPU 10 is a main controller of the disk drive, and executes a data read/write operation, and control of each of SPM 2 and VCM 5.
(Magnetic response characteristic of the GMR element)

The operation according to the embodiment of the present invention will be explained below.

In the embodiment of the present invention, at the time of a read operation, the read head 30 reads out the perpendicularly magnetically recorded data signal from the disk medium 1. Specifically, the read head 30 outputs a read signal 20 of a rectangular waveform according to the recording magnetic field on the disk medium 1, as shown in FIG. 2B. The GMR element of the read head 30 has a magnetic field response characteristic as shown in FIGS. 2A and 2D. Specifically, the GMR element has a nonlinear characteristic (reference numeral 310) as shown in FIG. 3.

The read signal output from the read head 30 is input, via the read amplifier 60, to the AGC amplifier 70 of the read/write channel 7, as shown in FIG. 1. The differentiation circuit included in the signal processing circuit 71 converts the waveform of the read signal 20 from the AGC amplifier 70 into a differentiated signal waveform, as shown in FIG. 2C. The signal processing circuit 71 performs various signal processing on the differentiated signal waveform. The decoder 72 decodes the original recorded data and outputs the decoded data as the read data RD.

Figure 4:
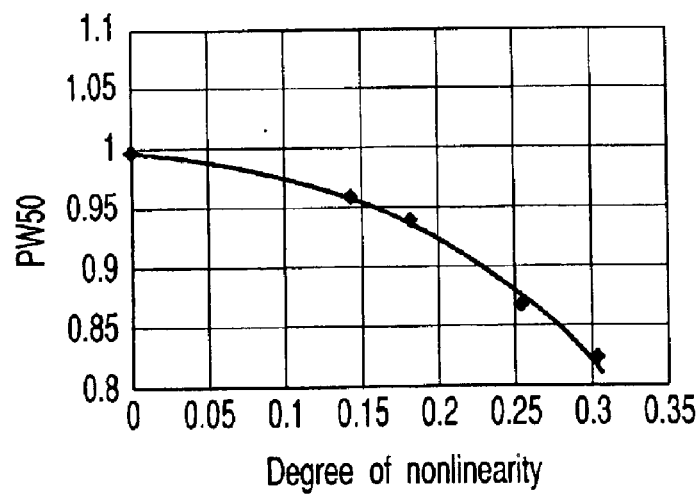
FIG. 4 is a diagram for explaining the relationship between the degree of nonlinearity and PW50 according to the embodiment of the present invention.

In such a data reproduction operation, in order to enhance reproduction resolution and improve the read error rate, it is effective to minimize the pulse width at 50% threshold (PW50) of the differentiated signal waveform as shown in FIG. 2C. In this embodiment, the GMR element which forms the read head 30 has a magnetic field response characteristic indicating such a degree of nonlinearity that can decrease the PW50, in terms of the relationship between the degree of nonlinearity and the PW50, as shown in FIG. 4. This will be explained below more specifically.

Figure 3:
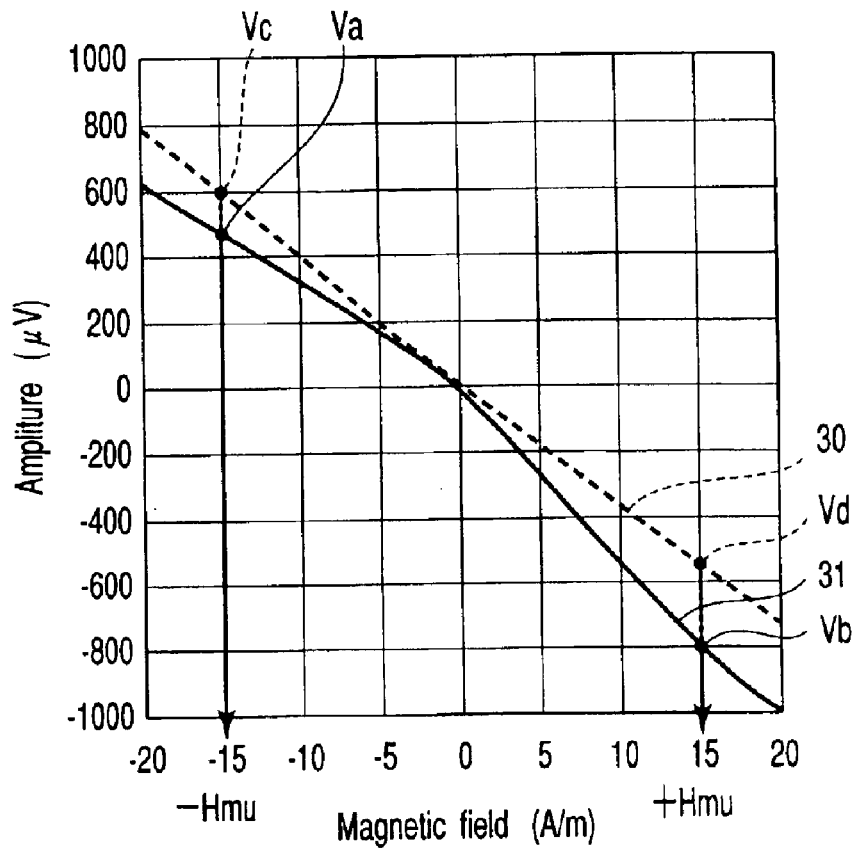
FIG. 3 is a diagram for explaining the degree of nonlinearity of the magnetic field response characteristic.
Figure 5A:
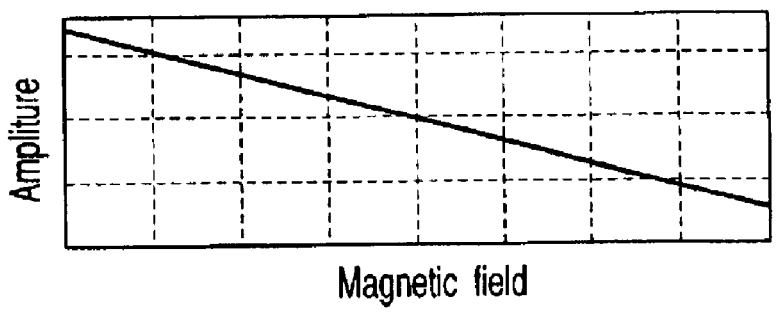
FIGS. 5A to 5D are diagrams showing one example of the magnetic field response characteristic of the GMR element according to the embodiment of the present invention.
Figure 5B:
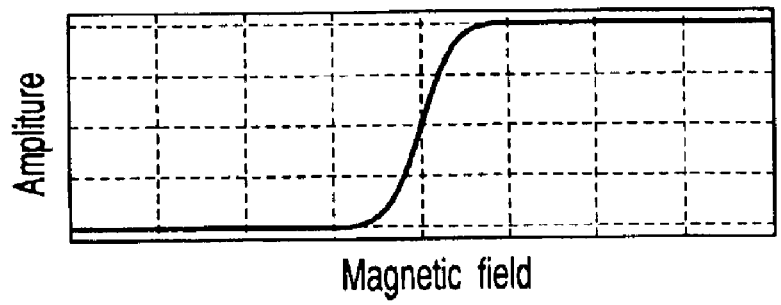
Figure 5C:
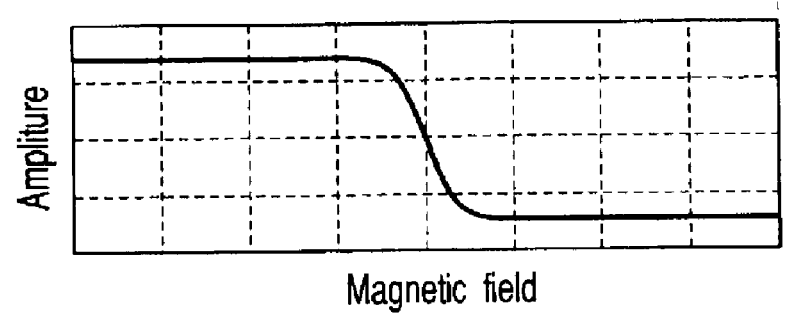
Figure 5D:
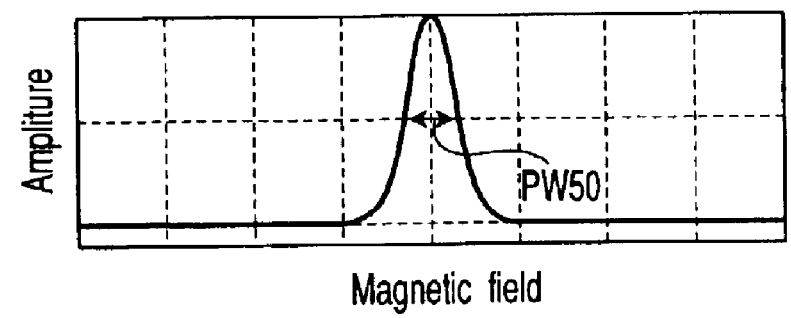

With respect to the magnetic field response characteristic of the GMR element, FIG. 5A shows the case in which the relationship between the magnetic field (recording magnetic field from the disk medium 1) and the amplitude value ($\mu$V) of the read signal is substantially linear, i.e., the degree of nonlinearity is zero (corresponding to the dotted line 300 in FIG. 3). FIG. 5B shows an arc tan type magnetization transfer form (reference numeral 21 of FIG. 2B) of the read signal waveform (20) shown in FIG. 5C. FIG. 5D shows the differentiated signal waveform (differentiated read signal) of the read signal 20 output from the above-described differentiation circuit.

It is assumed that if the magnetic field response characteristic of the GMR element is substantially linear (i.e., the degree of nonlinearity is zero), the PW50 of the differentiated read signal indicates the maximum value, and is 100%, as shown in FIG. 5D. That is, the degree of nonlinearity is "0" and the PW50 is "1".

Based on the above assumption, the degree of nonlinearity in the magnetic field response characteristic of the GMR element is defined, with reference to FIG. 3.

FIG. 3 is a diagram specifically showing FIG. 2A.

As the range of the input magnetic field to the GMR element (i.e., recording magnetic field from the disk 1), the range from −Hmu (−15 A/m in this case) as a maximum magnetic field or limit magnetic field, to the input magnetic field 0, and the range from the input magnetic field 0 to +Hmu (+15 A/m in this case) as the maximum magnetic field or limit magnetic field are assumed.

The magnetic field response characteristic of the GMR element can be expressed as a characteristic curve 310 indicating the variation of the amplitude value (output level) in relation to the input magnetic field. The degree of nonlinearity of the characteristic curve 310 is schematically expressed by the curvature, whether it is convex or concave, in relation to the linearity (straight line 300) within the range of the input magnetic field. If there is an extreme point falling outside this range, distortion occurs in the magnetic field response characteristic of the GMR element. Accordingly, it is conceivable that waveform distortion departing from the permissible range occurs in the read signal waveform.

The definition of the degree of nonlinearity will be specifically explained below.

As shown in FIG. 3, a tangent 300 is drawn at the maximum inclination point of the characteristic curve 310, and points of contact between the tangent 300 and the maximum magnetic field (±Hmu) are regarded as Vc and Vd, respectively. On the other hand, response output values (amplitude values) at the maximum magnetic fields (±Hmu) in the magnetic field response characteristic (characteristic curve 310) of the GMR element are regarded as Va and Vb, respectively. The degree of nonlineairty (NL) of the magnetic field response characteristic of the GMR element in this case is defined by the following expression (1):

$$NL=(|Va/Vc-1|+|Vb/Vd-1|)/2 \qquad (1).$$

If the magnetic field response characteristic is linear, the degree of nonlinearity is zero (NL=0).

FIG. 4 shows the relationship between the degree of nonlinearity of the magnetic field response characteristic of the GMR element and the PW50 of the differentiated signal waveform of the read signal output by the GMR element. As described above, it is assumed that if the magnetic field response characteristic is linear (degree of nonlinearity is 0), the PW50 is the maximum value (1) and 100%. As a specific example, a single magnetic pole type head is used as the write head 31, and a disk 1 having a double-layered structure with Ms=2.4e4(A/m), Hc=2.8e5(A/m), and ΔHc/Hc=0.24, and a read head 30 having a gap length of 75 nm are used. In this case, the pulse width at 50% threshold (PW50) of the differentiated signal waveform is about 79 nm.

On the other hand, if the degree of nonlinearity is 0.15, the pulse width at 50% threshold (PW50) of the differentiated signal waveform is about 75 nm, as shown in FIG. 4. In other words, the PW50 narrows to about 95% compared with the differentiated signal waveform shown in FIG. 5D in the case of the characteristic being linear. In the range of the input magnetic field (range of ±Hmu), the degree of nonlinearity may also be defined as, e.g. 0.15, not only at both plus (+) and minus (−) sides, but also at one side alone.

In a word, with respect to the recording magnetic field from the disk 1 of the perpendicular magnetic recording method, it is possible to adjust the amount of variation in the pulse width at 50% threshold (PW50) of the differentiated signal waveform of the read signal, depending on the degree of nonlinearity of the magnetic field response characteristic of the GMR element used for the read head 30. Therefore, a GMR element having a magnetic field response characteristic indicating a predetermined degree of nonlinearity is used as the read head 30, thereby decreasing the PW50 of the differentiated read signal relatively (compared, especially, with the case of the characteristic being linear).

Thereby, if data RD is reproduced from the differentiated read signal in the read/write channel 7, it is possible to improve the read error rate by increasing the reproduction resolution. Therefore, in a disk drive of the perpendicular magnetic recording method, a read signal quality of high resolution can be obtained without requiring improvements for reducing the size of the right head 31. As a result, a high recording density can be realized.

In the perpendicular magnetic recording method, if a DC signal is recorded on the disk 1, the GMR element indicates the response characteristic at the vicinity of the maximum magnetic field (±Hmu) of the input magnetic field. Thus, the response is smaller if the response characteristic is a non-linear curve, thus the occurrence of DC noise is reduced. Consequently, DC noise can be suppressed, which is advantageous.

As described above, particularly in a disk drive of the perpendicular magnetic recording method, a GMR element having a magnetic field response characteristic indicating a predetermined degree of nonlinearity is used as a read head, thereby achieving minimization of the pulse width at 50% threshold of the differentiated read signal. Therefore, high resolution at the time of reproducing data can be achieved. As a result, a high recording density can be promoted.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A magnetic disk drive comprising:
a magnetic disk medium for magnetically recording data;
a signal processing circuit including a differentiation circuit for differentiating a read signal read out from the magnetic disk medium, and reproducing the data recorded on the magnetic disk medium from a read differentiated signal output from the differentiation circuit, and
a read head for reading out the data magnetically recorded on the magnetic disk medium to output the read signal, and having a magnetic field response characteristic such that a pulse width at 50% threshold of a waveform of a read differentiated signal output from the differentiation circuit is set within a predetermined range,
wherein the read head has a degree of nonlinearity such that the pulse width at 50% threshold is set within a range from a predetermined minimum value to a maximum value, the pulse width at 50% threshold indicating the maximum value when the degree of nonlinearity of the magnetic field response characteristic is zero.

2. A magnetic disk drive according to claim 1, wherein the read head comprises a GMR (giant magnetoresistive) element, and the read head and a write head for magnetically recording data on the magnetic disk medium form a magnetic head.

3. A magnetic disk drive according to claim 1, wherein the signal processing circuit is a read channel for performing signal processing, with a PRML (partial response maximum likelihood) method, on an output signal from the differentiation circuit.

4. A magnetic disk drive comprising:
a magnetic disk medium for magnetically recording data;
a signal processing circuit including a differentiation circuit for differentiating a read signal read out from the magnetic disk medium, and reproducing the data recorded on the magnetic disk medium from a read differentiated signal output from the differentiation circuit; and
a read head for reading out the data magnetically recorded on the magnetic disk medium to output the read signal, and having a magnetic field response characteristic such that a pulse width at 50% threshold of a waveform of a read differentiated signal output from the differentiation circuit is set within a predetermined range, wherein
the magnetic field response characteristic refers to a characteristic indicating a variation in amplitude values of the read signal output from the read head in relation to the recording magnetic field on the magnetic disk medium,
the degree of nonlinearity is set based on an increased/decreased value of the amplitude value within the same range of the recording magnetic field in relation to a reference line, the degree of nonlinearity of the reference line being assumed to be zero when the variation in amplitude values indicates linearity, and
the read head has the magnetic field response characteristic including a predetermined value of said degree of nonlinearity.

5. A magnetic disk drive according to claim 4, wherein the read head comprises a GMR (giant magnetoresistive) element, and the read head and a write head for magnetically recording data on the magnetic disk medium form a magnetic head.

6. A magnetic disk drive according to claim 4, wherein the signal processing circuit is a read channel for performing signal processing, with a PRML (partial response maximum likelihood) method, on an output signal from the differentiation circuit.

7. A magnetic disk drive comprising:
a magnetic disk medium for magnetically recording data;
a signal processing circuit including a differentiation circuit for differentiating a read signal read out from the magnetic disk medium, and reproducing the data recorded on the magnetic disk medium from a read differentiated signal output from the differentiation circuit; and
a read head for reading out the data magnetically recorded on the magnetic disk medium to output the read signal, and having a magnetic field response characteristic such that a pulse width at 50% threshold of a waveform of a read differentiated signal output from the differentiation circuit is set within a predetermined range, wherein
the magnetic field response characteristic refers to a characteristic indicating a variation in amplitude values of the read signal output from the read head in relation to the recording magnetic field on the magnetic disk medium, and
where a tangent is assumed at a maximum inclined point within a predetermined range of the recording magnetic field in the magnetic field response characteristic, and amplitude values which corresponds to points of contact between the tangent and limit values (two points off) of the recording magnetic field are expressed as Vc and Vd, respectively, and amplitude values which are response values corresponding to the limit values are expressed as Va and Vb,
the read head has the magnetic field response characteristic including a predetermined degree of nonlinearity determined by relational expression $(|Va/Vc-1|+|Vb/Vd-1|)/2$, the degree of nonlinearity being defined as zero if the magnetic field response characteristic indicates linearity.

8. A magnetic disk drive according to claim 7, wherein the read head comprises a GMR (giant magnetoresistive) element, and the read head and a write head for magnetically recording data on the magnetic disk medium form a magnetic head.

9. A magnetic disk drive according to claim 7, wherein the signal processing circuit is a read channel for performing signal processing, with a PRML (partial response maximum likelihood) method, on an output signal from the differentiation circuit.

10. A magnetic disk drive comprising:
a magnetic disk medium for magnetically recording data by a perpendicular magnetic recording method;
a read channel including a differentiation circuit for differentiating a read signal of a rectangular waveform read out from the magnetic disk medium, and reproducing the data recorded on the magnetic disk medium from a read differentiated signal output from the differentiation circuit; and
a magnetic head having a write head for perpendicularly magnetically recording data on the magnetic disk medium, and a read head for reading out the data magnetically recorded on the magnetic disk medium to output the read signal and having a magnetic field response characteristic such that a pulse width at 50% threshold of a waveform of a read differentiated signal output from the differentiation circuit is set within a predetermined range, wherein the read head has a degree of nonlinearity such that the pulse width at 50% threshold is set within a range from a predetermined minimum value to a maximum value, the pulse width at 50% threshold indicating the maximum value when the degree of nonlinearity of the magnetic field response characteristic is zero.

11. A magnetic disk drive according to claim 10, wherein the read head comprises a GMR (giant magnetoresistive) element, and the write head is a single pole type head.

12. A magnetic disk drive according to claim 10, wherein the read channel performs signal processing, with a PRML (partial response maximum likelihood) method, on the output signal from the differentiation circuit.

13. A magnetic disk drive according to claim 10, wherein the magnetic disk medium is a double-layered perpendicular recording medium having a perpendicular recording layer and a soft magnetic layer.

14. A magnetic disk drive comprising:
a magnetic disk medium for magnetically recording data by a perpendicular magnetic recording method;
a read channel including a differentiation circuit for differentiating a read signal of a rectangular waveform read out from the magnetic disk medium, and reproducing the data recorded on the magnetic disk medium from a read differentiated signal output from the differentiation circuit; and
a magnetic head having a write head for perpendicularly magnetically recording data on the magnetic disk medium, and a read head for reading out the data magnetically recorded on the magnetic disk medium to output the read signal and having a magnetic field response characteristic such that a pulse width at 50% threshold of a waveform of a read differentiated signal output from the differentiation circuit is set within a predetermined range,
wherein the magnetic field response characteristic refers to a characteristic indicating a variation in amplitude values of the read signal output from the read head in relation to the recording magnetic field on the magnetic disk medium,
the degree of nonlinearity is set based on an increased/decreased value of the amplitude value within the same range of the recording magnetic field in relation to a reference line, the degree of nonlinearity of the reference line being assumed to be zero when the variation in amplitude values indicates linearity, and
the read head has the magnetic field response characteristic including a predetermined value of said degree of nonlinearity.

15. A magnetic disk drive according to claim 14, wherein the read head comprises a GMR (giant magnetoresistive) element, and the write head is a single pole type head.

16. A magnetic disk drive according to claim 14, wherein the read channel performs signal processing, with a PRML (partial response maximum likelihood) method, on the output signal from the differentiation circuit.

17. A magnetic disk drive according to claim 14, wherein the magnetic disk medium is a double-layered perpendicular recording medium having a perpendicular recording layer and a soft magnetic layer.

18. A magnetic disk drive comprising:
a magnetic disk medium for magnetically recording data by a perpendicular magnetic recording method;
a read channel including a differentiation circuit for differentiating a read signal of a rectangular waveform read out from the magnetic disk medium, and reproducing the data recorded on the magnetic disk medium from a read differentiated signal output from the differentiation circuit; and
a magnetic head having a write head for perpendicularly magnetically recording data on the magnetic disk medium, and a read head for reading out the data magnetically recorded on the magnetic disk medium to output the read signal and having a magnetic field response characteristic such that a pulse width at 50% threshold of a waveform of a read differentiated signal output from the differentiation circuit is set within a predetermined range,
wherein the magnetic field response characteristic refers to a characteristic indicating a variation in amplitude values of the read signal output from the read head corresponding to the recording magnetic field on the magnetic disk medium, and
where a tangent is assumed at a maximum inclined point within a predetermined range of the recording magnetic field in the magnetic field response characteristic, and amplitude values which correspond to points of contact between the tangent and limit values (two points of ±) of the recording magnetic field are expressed as Vc and Vd, respectively, and amplitude values which are response values corresponding to the limit values are expressed as Va and Vb,
the read head has the magnetic field response characteristic including a predetermined degree of nonlinearity determined by relational expression $(|Va/Vc-1|+|Vb/Vd-1|)/2$, the degree of nonlinearity being defined as zero if the magnetic field response characteristic indicates linearity.

19. A magnetic disk drive according to claim 18, wherein the read head comprises a GMR (giant magnetoresistive) element, and the write head is a single pole type head.

20. A magnetic disk drive according to claim 18, wherein the read channel performs signal processing, with a PRML (partial response maximum likelihood) method, on the output signal from the differentiation circuit.

21. A magnetic disk drive according to claim 18, wherein the magnetic disk medium is a double-layered perpendicular recording medium having a perpendicular recording layer and a soft magnetic layer.

* * * * *